(12) United States Patent
Erneland

(10) Patent No.: US 9,995,846 B2
(45) Date of Patent: *Jun. 12, 2018

(54) ULTRASONIC CLEANING OF MARINE GEOPHYSICAL EQUIPMENT

(71) Applicant: PGS Geophysical AS, Oslo (NO)

(72) Inventor: Michael Bo Erneland, Loddekopinge (SE)

(73) Assignee: PGS Geophysical AS, Oslo (NO)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/280,275

(22) Filed: Sep. 29, 2016

(65) Prior Publication Data
US 2017/0017012 A1 Jan. 19, 2017

Related U.S. Application Data

(62) Division of application No. 13/629,412, filed on Sep. 27, 2012.

(51) Int. Cl.
*B08B 7/00* (2006.01)
*B08B 7/04* (2006.01)
(Continued)

(52) U.S. Cl.
CPC .............. *G01V 13/00* (2013.01); *B08B 1/002* (2013.01); *B08B 3/12* (2013.01); *G01V 1/201* (2013.01);
(Continued)

(58) Field of Classification Search
CPC ...... G01V 13/00; G01V 1/3808; G01V 1/201; B08B 1/002; B08B 3/12
See application file for complete search history.

(56) References Cited

U.S. PATENT DOCUMENTS

| 3,734,048 A | 5/1973 | Michaelsen |
| 4,092,858 A * | 6/1978 | Edgerton ................. G01V 1/38 73/170.29 |

(Continued)

FOREIGN PATENT DOCUMENTS

| EP | 2703850 | 3/2014 |
| GB | 2444604 | 6/2008 |

(Continued)

OTHER PUBLICATIONS

Examination Report in GB Application No. 1316069.2 dated May 20, 2016, 2 pages.
(Continued)

*Primary Examiner* — Alexander Markoff

(57) ABSTRACT

Various methods and apparatuses for facilitating cleaning of submerged geophysical equipment using sound waves transmitted at ultrasonic frequencies are disclosed. In some embodiments, one or more transducers may be configured to transmit sound at one or more ultrasonic frequencies. The sound at ultrasonic frequencies may be transmitted in the vicinity of submerged geophysical equipment, such as a sensor streamer towed behind a survey vessel. Obstructions (e.g., barnacle larvae) adhering to surfaces of the geophysical equipment may be loosened or removed altogether when ultrasonic transmissions occur within its vicinity. The transducers used to transmit the ultrasonic frequencies may be implemented in various ways, such as being attached to a remote operated vehicle, a cleaning unit, or as being an integral component of the geophysical equipment.

17 Claims, 9 Drawing Sheets

(51) Int. Cl.
*G01V 13/00* (2006.01)
*B08B 3/12* (2006.01)
*G01V 1/20* (2006.01)
*G01V 1/38* (2006.01)
*B08B 1/00* (2006.01)

(52) U.S. Cl.
CPC .......... *G01V 1/3808* (2013.01); *G01V 1/3843* (2013.01)

(56) References Cited

U.S. PATENT DOCUMENTS

| | | | |
|---|---|---|---|
| 4,536,690 A | | 8/1985 | Belsterling et al. |
| 4,751,113 A | | 6/1988 | Riccio et al. |
| 4,821,665 A | | 4/1989 | Matthias et al. |
| 4,821,685 A | | 4/1989 | Matsushima et al. |
| 4,912,682 A | * | 3/1990 | Norton, Jr. .......... G01V 1/3835 367/19 |
| 5,136,613 A | | 8/1992 | Dumestre, III |
| 5,532,980 A | | 7/1996 | Zarate et al. |
| 5,668,775 A | * | 9/1997 | Hatteland .......... G01V 1/3835 367/127 |
| 5,735,226 A | * | 4/1998 | McNeal .................. B63B 59/04 114/222 |
| 5,889,209 A | * | 3/1999 | Piedrahita .............. G10K 15/02 367/147 |
| 5,947,051 A | | 9/1999 | Geiger |
| 6,276,478 B1 | | 8/2001 | Hopkins et al. |
| 6,578,405 B2 | | 6/2003 | Kleinberg et al. |
| 6,697,300 B1 | | 2/2004 | Holt |
| 7,022,750 B2 | | 4/2006 | Camp et al. |
| 7,145,833 B1 | * | 12/2006 | Hoogeveen ............. B08B 9/023 134/6 |
| 7,211,173 B1 | | 5/2007 | Staerzl et al. |
| 7,409,919 B2 | | 8/2008 | Hoogeveen et al. |
| 7,754,018 B2 | | 7/2010 | Lepage et al. |
| 7,835,222 B2 | | 11/2010 | Lobe et al. |
| 8,091,647 B2 | | 1/2012 | Nicholson et al. |
| 8,875,722 B2 | | 11/2014 | Karlsen et al. |
| 8,960,117 B2 | * | 2/2015 | Nielsen .................. B08B 1/008 114/244 |
| 2007/0091719 A1 | * | 4/2007 | Falkenberg .......... G01V 1/3835 367/19 |
| 2008/0127875 A1 | * | 6/2008 | Hoogeveen ............. B08B 9/023 114/312 |
| 2009/0314193 A1 | | 12/2009 | Groves et al. |
| 2010/0020644 A1 | | 1/2010 | Vignaux |
| 2010/0042389 A1 | * | 2/2010 | Farruggia ................. B08B 3/12 703/6 |
| 2010/0126403 A1 | | 5/2010 | Rooney, III et al. |
| 2010/0269731 A1 | | 10/2010 | Tofte Jespersen et al. |
| 2010/0278011 A1 | | 11/2010 | Harrick |
| 2011/0123477 A1 | | 5/2011 | Mount et al. |
| 2011/0174207 A1 | | 7/2011 | Harrick et al. |
| 2011/0197919 A1 | | 8/2011 | Tilley |
| 2011/0255369 A1 | | 10/2011 | Harrick et al. |
| 2011/0311769 A1 | | 12/2011 | Chen et al. |
| 2012/0176858 A1 | | 7/2012 | Stenzel et al. |
| 2012/0176860 A1 | | 7/2012 | Stenzel et al. |
| 2012/0205246 A1 | | 8/2012 | Chew |
| 2012/0222709 A1 | * | 9/2012 | Karlsen ................ G01V 1/3808 134/141 |
| 2012/0243370 A1 | | 9/2012 | Vignaux |
| 2012/0250458 A1 | | 10/2012 | Tonchia |
| 2012/0301423 A1 | | 11/2012 | Chai et al. |
| 2012/0321809 A1 | | 12/2012 | Hartshorne et al. |
| 2013/0039153 A1 | | 2/2013 | Hartshorne et al. |
| 2013/0098394 A1 | | 4/2013 | Fleischer-Pedersen |
| 2013/0265850 A1 | * | 10/2013 | Wu .......................... B08B 1/008 367/20 |
| 2013/0276840 A1 | | 10/2013 | Farruggia et al. |
| 2014/0069313 A1 | * | 3/2014 | Nielsen .................. B08B 1/008 114/244 |
| 2014/0083449 A1 | | 3/2014 | Erneland |

FOREIGN PATENT DOCUMENTS

| | | |
|---|---|---|
| GB | 2488635 | 9/2012 |
| GB | 2496033 | 5/2013 |
| WO | 2008020887 | 2/2008 |
| WO | 2012039625 | 3/2012 |

OTHER PUBLICATIONS

Search Report in GB Application No. 1316069.2 dated Nov. 4, 2013, 3 pages.

Office Action in U.S. Appl. No. 13/629,412 dated Jan. 6, 2016, 12 pages.

Office Action in U.S. Appl. No. 13/629,412 dated Jun. 29, 2016, 12 pages.

* cited by examiner

ULTRASONIC CLEANING OF MARINE GEOPHYSICAL EQUIPMENT

CROSS-REFERENCE TO RELATED APPLICATIONS

The present application is a divisional of U.S. application Ser. No. 13/629,412, filed Sep. 27, 2012, the disclosures of which is incorporated by reference herein in its entirety.

BACKGROUND

Background Description

Marine seismic surveys utilize sound waves transmitted to the earth's crust and reflected back to recording sensors. The recording sensors may be hydrophones in one of a number of streamers that may be towed behind a survey boat. The survey boat may tow an array of multiple streamers in parallel. When towed behind the survey boat, the streamer may be submerged. A sound source may also be towed in the water behind the survey boat for transmitting the sound waves to be received by the hydrophones of the streamers. One common application of marine seismic surveying is oil and gas exploration in marine environments. More particularly, sound waves received during a marine seismic survey may be analyzed to locate hydrocarbon bearing geological structures, and thus determine where deposits of oil and natural gas may be located.

Periodically, cleaning operations may be conducted on streamers used in marine seismic surveys. Cleaning operations may be conducted by a crew on a workboat separate from the survey boat. To clean a particular one of the towed streamers, the workboat crew may lift the streamer out of the water, clean by hand, and lower the streamer back into the water. Since the streamers can have significant length, (e.g., 8 km), in some cases only a portion of the streamer is lifted out of the water. The workboat crew may progressively lift portions of a particular streamer out of the water until cleaning is complete. The workboat crew may then progress to the next streamer and repeat the process. The process may be subsequently repeated until all streamers have been cleaned. The process of cleaning using a workboat crew can be very time consuming, and in some cases, dangerous to the crew members that perform the work.

BRIEF DESCRIPTION OF THE DRAWINGS

Other aspects of the disclosure will become apparent upon reading the following detailed description and upon reference to the accompanying drawings which are now described as follows.

Figure 1:
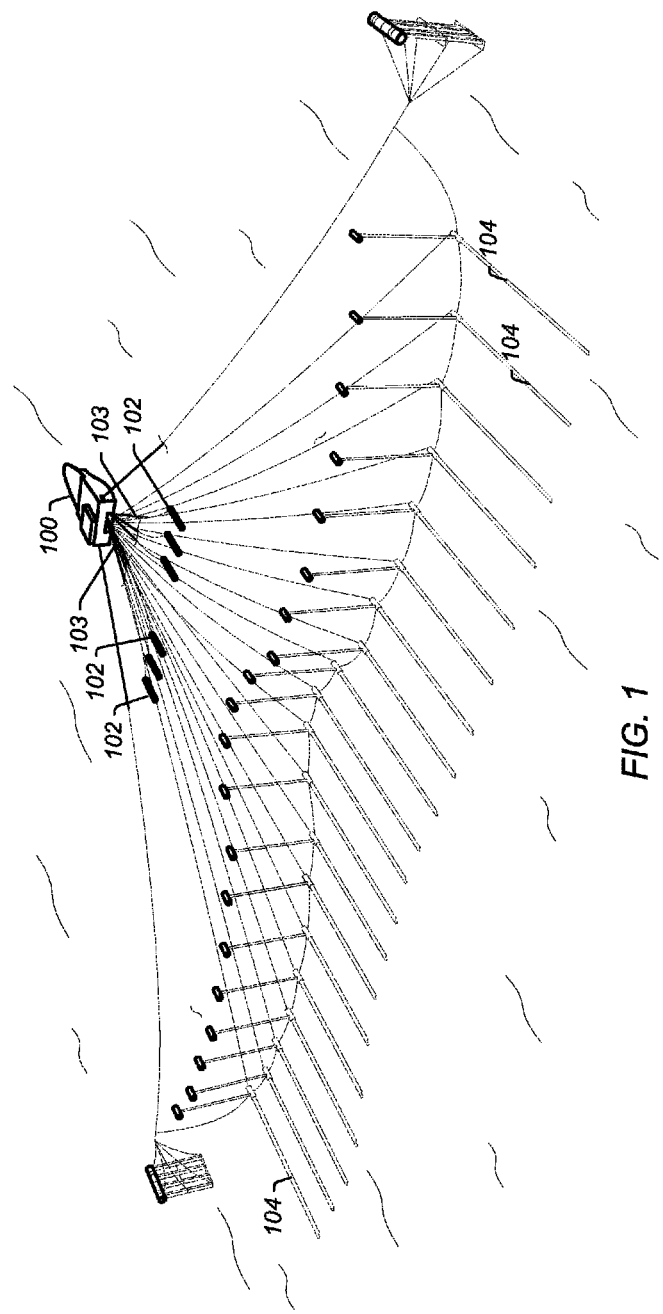
FIG. 1 is a diagram of one embodiment of an arrangement for conducting a marine geophysical survey using an array of towed submerged streamers.

While the embodiments disclosed herein are susceptible to various modifications and alternative forms, specific embodiments thereof are shown by way of example in the drawings and will herein be described in detail. It should be understood, however, that the drawings and description thereto are not intended to limit the disclosure to the particular forms disclosed; on the contrary, the disclosure is intended to cover all modifications, equivalents, and alternatives falling within the spirit and scope of the present disclosure as defined by the appended claims.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The present disclosure is directed to method and apparatus embodiments in which ultrasonic frequencies are used to clean submerged geophysical equipment. The ultrasonic frequencies may be transmitted by any type of transducer or other device capable of generating sound waves at those frequencies. The transmission of the ultrasonic frequencies may be used to facilitate the cleaning of various obstructions from the geophysical equipment. Such obstructions may include (but are not limited to) barnacle larvae, barnacles, and ice. In various embodiments, the geophysical equipment may be a sensor streamer that may be towed behind a survey vessel, although other types of geophysical equipment may also be cleaned using ultrasonic frequencies. As used herein, the term "ultrasonic" refers to frequencies above the range of normal human hearing, at least including frequencies greater than 20 kHz.

In various embodiments, a cleaning apparatus may include one or more transducers configured to transmit sound at ultrasonic frequencies. In one embodiment, a number of transducers may be integrated into a sensor streamer. The transducers may be periodically activated, or activated responsive to a command by a user at a control input. In another embodiment, a cleaning apparatus may include a streamer cleaning unit that is attachable to a sensor streamer. In addition to brushes and other mechanisms for physically removing obstructions from a sensor streamer, the streamer cleaning unit may also include one or more transducers that may be activated during a cleaning operation. In yet another embodiment, a cleaning apparatus may include a remotely operated vehicle having transducers capable of transmitting sound at ultrasonic frequencies.

Various embodiments of a method for cleaning geophysical equipment may include transmitting ultrasonic frequencies in the vicinity of the geophysical equipment. As used herein, the terms "in the vicinity" and "in a vicinity" refers to a location sufficiently near to the geophysical equipment that the transmission of the ultrasonic frequencies may effectively remove or at least loosen some obstructions thereof or other undesired matter attached thereto. Since the power at which the ultrasonic frequencies are transmitted may vary, the terms "in the vicinity" and "in a vicinity" may also be variable based on the transmission power. In one exemplary embodiment, transmissions may be made from 20 centimeters at a transmission power of 10 watts or greater using directional transducers to transmit the ultrasonic frequencies in a directed manner. It is noted that this example is not intended to be limiting, and the transmission power may be varied from one embodiment to the next.

The transducers used in the cleaning operations discussed herein may transmit sound at one or more ultrasonic frequencies. In one embodiment, the ultrasonic frequency at which sound is transmitted may be a discrete frequency which has been determined to be effective for the desired cleaning operation. In another embodiment, sound may be transmitted at multiple, discrete ultrasonic frequencies, sequentially or concurrently. In still another embodiment, the transmission of sound at ultrasonic frequencies may be performed by sweeping across a range of frequencies (e.g., between 20 kHz and 100 kHz). Sweeping of frequencies may begin at a high frequency and descend to a low frequency, or may begin at a low frequency and increase to a high frequency.

Turning now to FIG. 1, a diagram of one embodiment of an arrangement for conducting a marine geophysical survey using an array of towed submerged streamers is shown. In the embodiment shown, tow vessel 100 is towing an array of submerged streamers 104. Examples of such streamers may be found in U.S. Pat. No. 7,834,632 by Tenghamn et al. and U.S. Pat. No. 8,098,542 by Hillesund et al., each of which is incorporated herein by reference. Each of the submerged streamers may include a number of seismic sensors, EM receivers, or a combination thereof. The types of sensors that may be implemented in a given streamer include (but are not limited to) hydrophones and geophones. The types of receivers that may be implemented in a given streamer include (but are not limited to) electrodes and magnetometers. Moreover, a given streamer may include more than one type of sensor (e.g., a combination of hydrophones and geophones) or receiver (e.g., a combination of electrodes and magnetometers). Various operational considerations may make certain streamer towing depths advantageous. In some embodiments, single sensor streamers 104 may be towed at depths between about 4 meters and 30 meters. In some embodiments, dual sensor streamers may be towed at depths between 15 and 30 meters.

Tow vessel 100 may also tow a number of sources 102 via tow cables 103. In some embodiments, sources 102 may be towed by another vessel (not shown). Sources 102 may include a variety of seismic sources, such as marine vibrators or air guns. Sources 102 may also include a variety of electromagnetic (EM) sources, such as antennas or magnetic coils. In some embodiments, sources 102 may transmit sound waves into the water, the echoes of which may be detected by the seismic sensors of the streamers 104. In some embodiments, sources 102 may transmit EM signals into the water, which may be detected by the EM receivers of the streamers 104. The sensors and receivers of streamers 104 may be electrically coupled to electronic equipment aboard tow vessel 100 that may be used to analyze geophysical data, such as received echoes or detected signals. Using the arrangement shown in FIG. 1, marine geophysical surveys may be conducted. Among the uses of information obtained from such surveys may be the identification of geological formations indicative of oil and/or natural gas deposits.

The vessel may include thereon a geophysical survey recording system. The recording system may include equipment for conducting both seismic and electromagnetic surveys, such as navigation devices to determine the geodetic position at any time of the vessel and sensing instruments deployed on one or more streamers in the water. The recording system equipment may also include devices for processing and recording signals generated by the various sensors deployed in the water. Specific implementations of the recording system equipment are well known in the art and need not be described herein in further detail.

During the conduct of marine geophysical surveys, equipment may at times become obstructed. For example, the growth of barnacles and barnacle larvae on streamers may occur during the conduct of marine geophysical surveys, particularly in certain geographic locations. In colder geographic locations, ice may sometimes form on geophysical survey equipment such as the streamers discussed herein. When obstructions such as barnacles are attached to the streamers, the sensitivity of the sensors and receivers contained therein may be reduced. This in turn can adversely affect the data collected in the survey. Accordingly, cleaning of the streamers may be periodically performed in order to remove obstructions from the streamers 104 and thus to increase the effectiveness of a survey in progress.

In some embodiments, the cleaning of the streamers (and more generally, of geophysical equipment) may include transmission of sound at one or more ultrasonic frequencies. The sound may be transmitted toward the geophysical equipment undergoing the cleaning operations. Transmission of sound at one or more ultrasonic frequencies may be effective in loosening or removing various obstructions that may otherwise adhere to the geophysical equipment. Such obstructions that may be loosened or removed using sound transmitted at one or more ultrasonic frequencies may include, but are not limited to, barnacle larvae, barnacles, and ice. In cases where the obstructions are not completely removed, additional cleaning using brushes and/or other types of cleaning apparatuses may be utilized to complete the cleaning.

Figure 2:
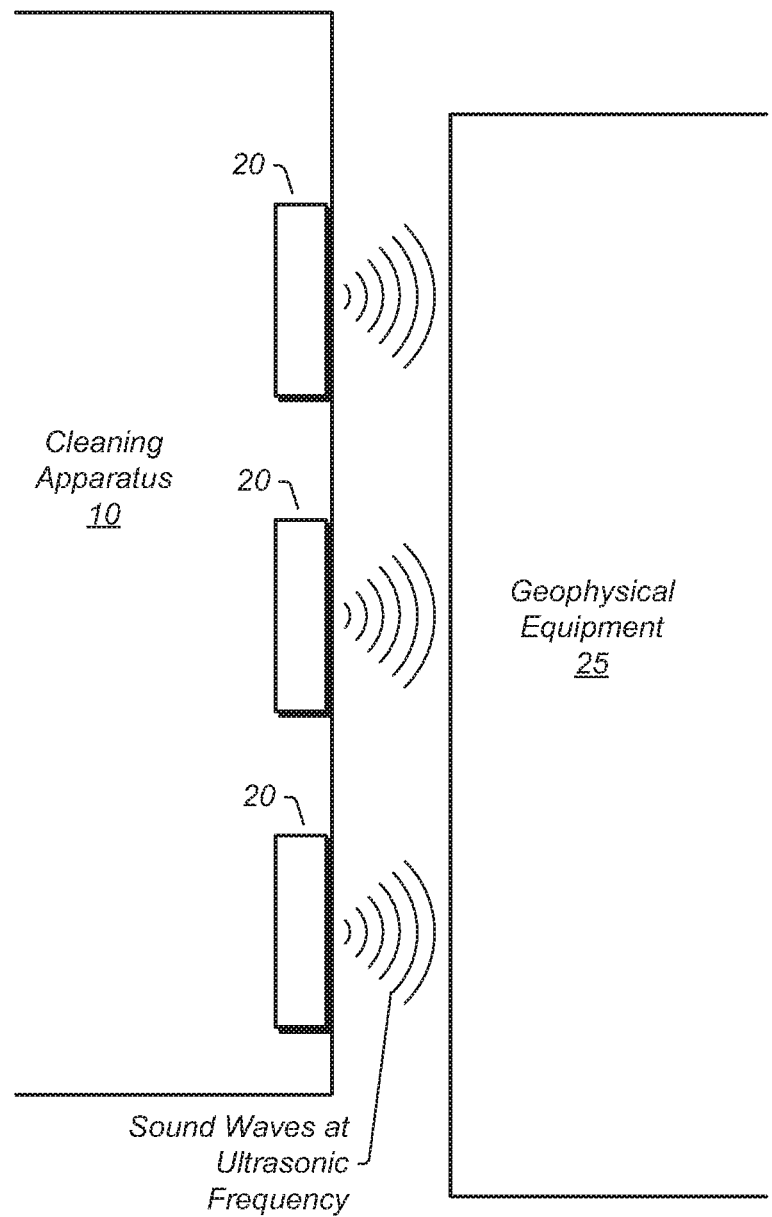
FIG. 2 is a diagram illustrating one embodiment of a cleaning apparatus conducting a cleaning of geophysical equipment using ultrasonic frequencies.

FIG. 2 is a diagram illustrating one embodiment of a cleaning apparatus conducting a cleaning of a piece of geophysical equipment using ultrasonic frequencies. In the embodiment shown, cleaning apparatus 10 includes a number of transducers 20 that are configured to transmit sound at one or more ultrasonic frequencies. As used herein, the term transducer refers to any device or apparatus capable of transmitting sound at ultrasonic frequencies. Such apparatus/device embodiments may include (but are not limited to) speakers and piezoelectric transducers. The sound at one or more ultrasonic frequencies may be transmitted in the vicinity of (and in this particular example, directly toward) geophysical equipment 25. The transmission at one or more ultrasonic frequencies may loosen or remove obstructions (such as those mentioned above) adhering to external surfaces of geophysical equipment 25.

Figure 3:
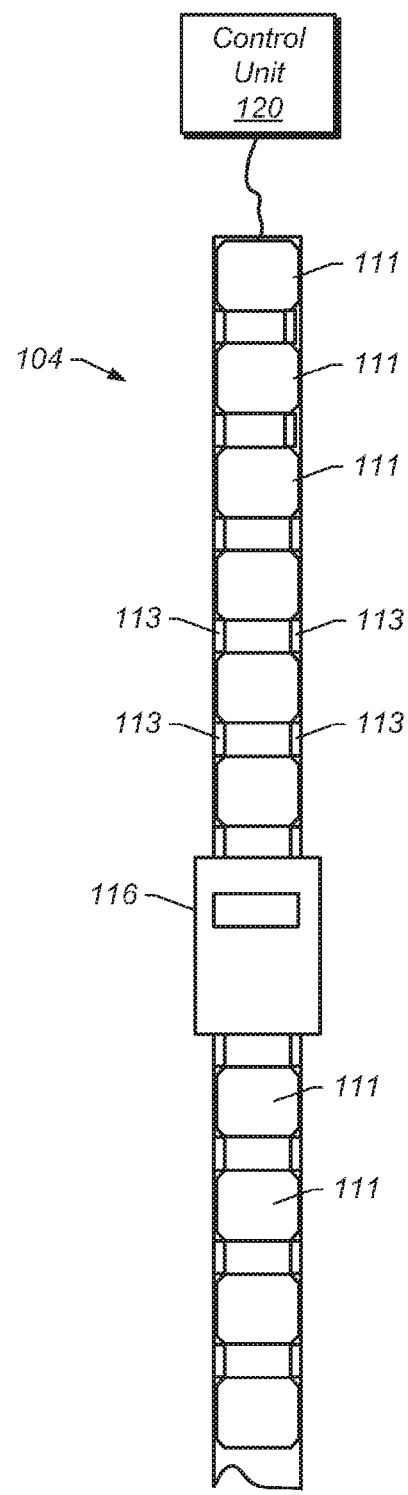
FIG. 3 is a diagram illustrating one embodiment of a sensor streamer having a plurality of sensors and a plurality of transducers integrated therein.

FIG. 3 is a diagram illustrating one embodiment of a sensor streamer having a plurality of sensors and a plurality of transducers integrated therein. In the embodiment shown, sensor streamer 104 includes a number of sensors 111. The sensors may include acoustic sensors, magnetic sensors, or any other type of sensors suitable for use in submerged streamers such as those shown in FIG. 1.

In addition to the sensors 111, sensor streamer 104 also includes a plurality of transducers 113. The transducers 113 in the embodiment shown may be configured to transmit sound at one or more ultrasonic frequencies. A control unit 120 coupled to sensor streamer 104 may be used to activate the transducers 113 in order to cause them to transmit sound responsive to a user input. Inputs from control unit 120 in some embodiments may determine the ultrasonic frequencies at which sound is transmitting. Sound may be transmitted at a single ultrasonic frequency, at a number of discrete ultrasonic frequencies (sequentially or concurrently), or by sweeping across a range of ultrasonic frequencies. Sound transmitted at one or more ultrasonic frequencies by transducers 113 may facilitate the cleaning of sensor streamer 104, and more particularly, for loosening or removing obstructions otherwise adhered thereto.

Streamer 104 in the embodiment shown also includes a streamer telemetry unit (STU) 116. STU 116 may be used to perform measurements based on raw data received from the sensors 111, and may also transmit measurement data to receiving equipment on tow vessel 100. STU 116 may be susceptible to attracting barnacles and barnacle larvae. Accordingly, one or more transducers 113 may be located in the vicinity of STU 116, if not within the unit itself.

Figure 4:
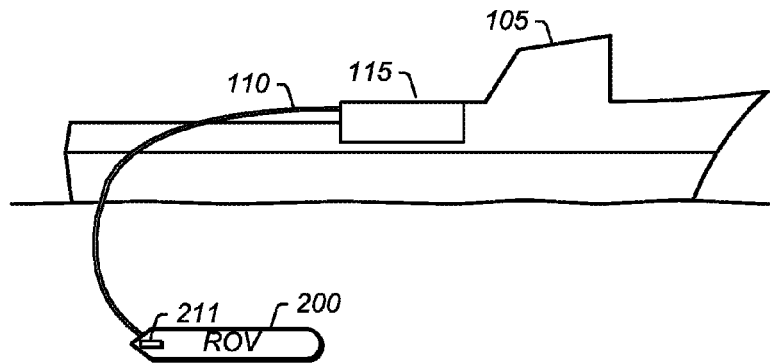
FIG. 4 is a diagram of one embodiment of a chase vessel and a remotely operated vehicle (ROV) controlled therefrom.

Cleaning of survey equipment (e.g., streamers 104, sources 102, or tow cables 103) as discussed herein may, in some embodiments, be facilitated by the use of an ROV. Turning now to FIG. 4, a diagram of one embodiment of a chase vessel and an ROV controlled therefrom is illustrated. In the embodiment shown, chase vessel 105 is a boat separate from tow vessel 100 discussed above, and may be used in the conduct of survey equipment cleaning operations. An ROV 200 is tethered to chase vessel 105 by a cable 110 in the illustrated example. Cable 110 may be used to transfer signals between ROV 200 and a control unit 115 located on chase vessel 105. An operator at control unit 115 may maneuver ROV 200 using various controls that generate commands sent to ROV 200 via cable 110. Similarly, various types of feedback (e.g., visual, audio, etc.) may be relayed from ROV 200 to control unit 115. Cable 110 may be of sufficient length to allow ROV to traverse the entire length of a streamer while the chase vessel is at a distance and/or relatively stationary with respect to the streamer.

In the embodiment shown, ROV 200 includes one or more transducers 211 that may be configured to transmit sound at ultrasonic frequencies. In conducting a cleaning operation, ROV 200 may be maneuvered into the vicinity of a streamer while transmitting sound from transducer(s) 211. As is discussed below, in one embodiment a cleaning method includes an ROV 200 causing a cleaning attachment to traverse the length of a streamer while sound is transmitted at ultrasonic frequencies by transducer(s) 211 as ROV 200 moves cleaning attachment to move along the streamer.

Figure 5A:
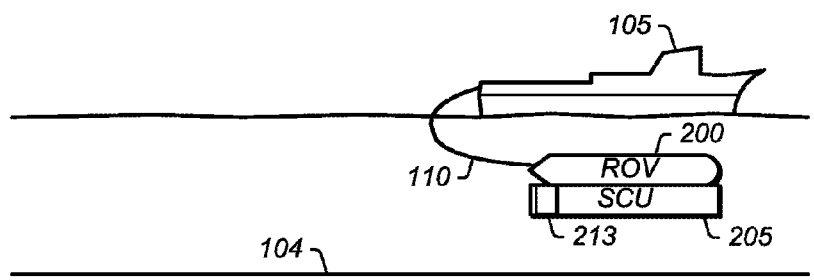
FIGS. 5A and 5B are diagrams illustrating one embodiment of a ROV attaching a streamer cleaning unit (SCU) to a submerged streamer being towed behind a boat.
Figure 5B:
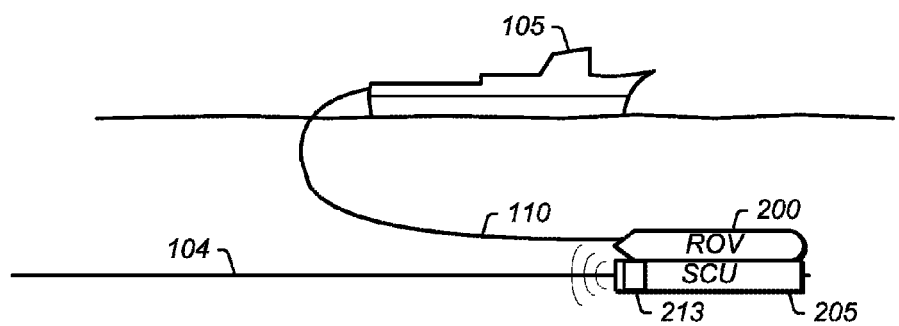

In some embodiments, ROV 200 may be used to facilitate cleaning of a streamer by attaching an SCU thereto, wherein the SCU includes transducers configured to transmit sound at ultrasonic frequencies. FIGS. 5A and 5B are diagrams illustrating one embodiment of a ROV attaching an SCU unit to a submerged streamer being towed behind a boat. In FIG. 5A, an SCU 205 has been attached to ROV 200. The attachment of the ROV 200 to SCU 205 may occur either with at least one of them above the waterline or with both submerged in the water. Under control of an operator at control unit 115, ROV 200, with SCU 205 attached thereto, may be maneuvered to a streamer 104 to be cleaned while the streamer is submerged and being towed behind a tow vessel 100.

SCU 205 in the embodiment shown includes a cleaning apparatus 213. More particularly, cleaning apparatus 213 may include one or more transducers from which sound may be transmitted at one or more ultrasonic frequencies. These transducers may be activated once SCU 205 is attached to the streamer 104.

In FIG. 5B, ROV 200 has been maneuvered into position near streamer 104. More particularly, ROV 200 has been maneuvered into position to attach SCU 205 to the submerged streamer 104. In this particular example, ROV 200 has been maneuvered to attach SCU 205 to a forward end (e.g., the end closest to the tow vessel) of streamer 104. After SCU 205 has been attached to streamer 104, ROV 200 may release the SCU 205 to commence a cleaning operation. Since SCU 205 is attached to streamer 104 while both are submerged, there is no need to bring streamer 104 to the surface. Upon attachment to streamer 104, the transducer(s) of cleaning apparatus 213 may begin transmitting.

Figure 6:
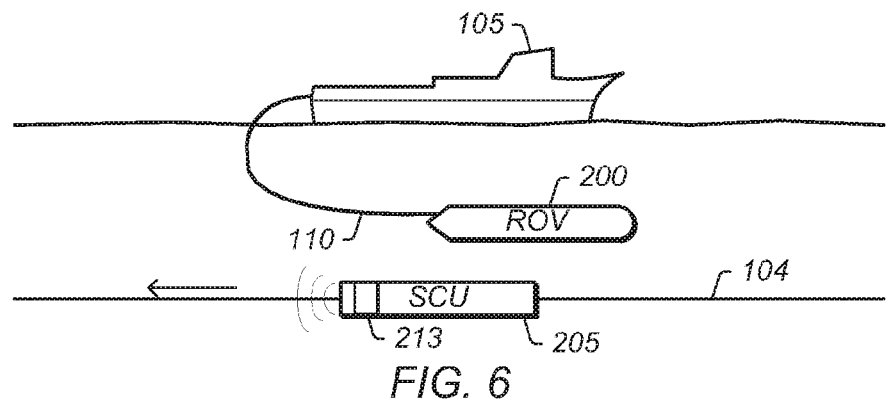
FIG. 6 is a diagram illustrating one embodiment of a SCU propelling itself along a streamer to conduct a cleaning operation.

FIG. 6 illustrates the streamer cleaning operation using SCU 205. In the illustrated example, ROV 200 has released SCU 205 subsequent to its attachment to streamer 104. Upon its release, the illustrated embodiment of SCU 205 is propelled from the forward end of streamer 104 to the rear end by hydrodynamic drag. As SCU 205 traverses along streamer 104, transmission of sound at one or more ultrasonic frequencies may aid the cleaning. The transmission of sound at ultrasonic frequencies may remove some obstructions (e.g., barnacle larvae) previously adhering to streamer 104. Furthermore, other obstructions may be loosened by the ultrasonic frequency transmissions. Brushes or other physical cleaning apparatuses implemented on SCU 205 may cause these loosened obstructions to be permanently removed as SCU travels down the length of streamer 104.

Figure 7:
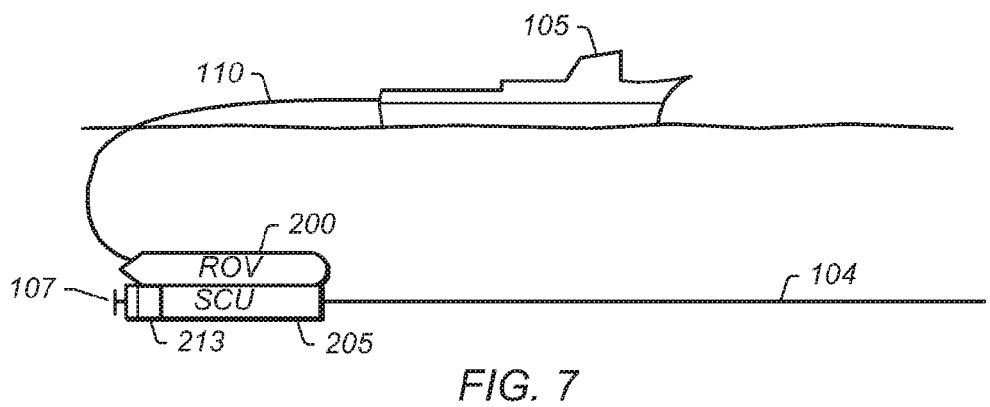
FIG. 7 is a diagram illustrating one embodiment of an ROV retrieving an SCU from a submerged streamer towed behind a boat.

In the example shown in FIG. 7, SCU 205 has reached the end of streamer 104. Streamer 104 includes a stopper 107 to hold SCU 205 in place while ROV 200 is maneuvered into position for retrieval. In the illustrated example, ROV 200 has been maneuvered into place in order to re-attach to SCU 205. Upon re-attachment of SCU 205 to ROV 200, SCU 205 may be removed from streamer 104. ROV 200 may then be maneuvered into position to attach SCU 205 to another streamer 104, or may be maneuvered back to chase vessel 105 where it may be taken on board.

Figure 8:
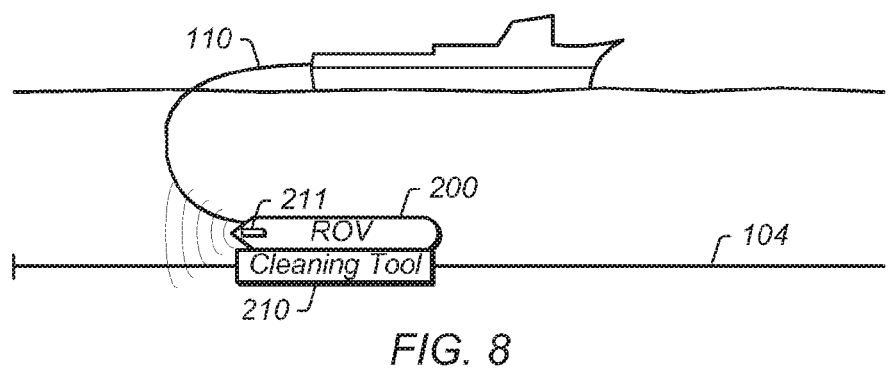
FIG. 8 is a diagram illustrating one embodiment of an ROV conducting a cleaning of a submerged sensor streamer using an attached cleaning apparatus.

FIG. 8 illustrates another type of cleaning operation that may be facilitated by an embodiment of ROV 200. In this example, ROV 200 has a cleaning tool 210 attached thereto. In one embodiment, ROV 200 may be configured for attachment of either SCU 205 or cleaning tool 210, both of which may be removable subsequent to attachment. Cleaning tool 210 may be arranged for a more thorough cleaning of a streamer 104 relative to the cleaning performed using SCU 205. Furthermore, ROV 200 may remain attached to cleaning tool 210 throughout the operation of cleaning a streamer 104. To perform the cleaning operation, ROV 200 may be maneuvered into close proximity to streamer 104 such that cleaning tool 210 may be attached to the streamer. ROV 200 may then propel cleaning tool 210 along the length of streamer 104, and may make multiple passes if desired. ROV 200 may also transmit sound at one or more ultrasonic frequencies from transducer(s) 211 during the cleaning operation. This may further increase the effectiveness of the cleaning by removing some obstructions while loosening others, thereby making their removal by cleaning tool 210 easier. Upon completion of the cleaning operation, ROV 200 may detach cleaning tool 210 from streamer 104.

Figure 9:
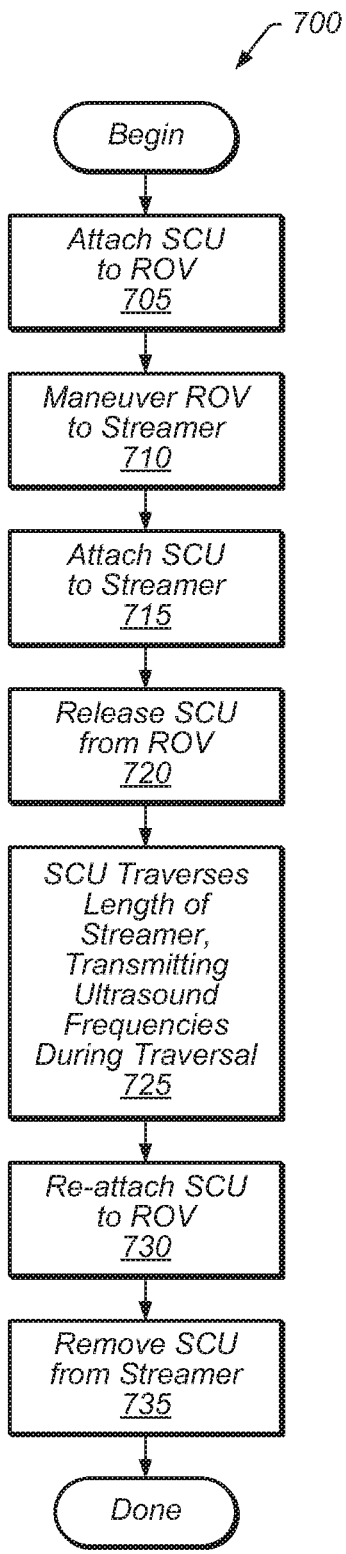
FIG. 9 is a flow diagram illustrating one embodiment of a method for conducting a cleaning operation of a sensor streamer using an SCU capable of transmitting sound at ultrasonic frequencies.

Turning now to FIG. 9, a flow diagram of one embodiment of a method for conducting a cleaning of a submerged, towed streamer using an ROV and a streamer cleaning apparatus is shown. In the embodiment shown, method 700 begins with the attachment of an SCU to an ROV (block 705). The attachment of the SCU to the ROV may be performed while both are in the water and submerged, although it is also possible and contemplated that an SCU may be attached to an ROV prior to submerging them in water.

With the SCU attached to the ROV, the ROV may then be maneuvered into close proximity to the streamer to be cleaned (block 710). In one embodiment, the ROV may be maneuvered into a position near the end of the streamer closest to the tow boat. When in close enough proximity, the SCU may be attached to the streamer (block 715). The SCU may be released from the ROV after having been securely attached to the streamer (block 720).

After the ROV has released the SCU, cleaning of the streamer may commence. The SCU discussed in this embodiment is a self-propelled unit, and may traverse the length of the streamer while transmitting sound at ultrasonic frequencies from one or more transducers (block 725). After the SCU has reached the end of the streamer, it may be held in place by a stopper in order to prevent it from becoming unintentionally de-attached from the streamer. The ROV may be maneuvered into position for re-attachment of the SCU (block 730). After re-attachment to the ROV, the SCU may be removed from the streamer for retrieval or for cleaning of another streamer.

Figure 10:
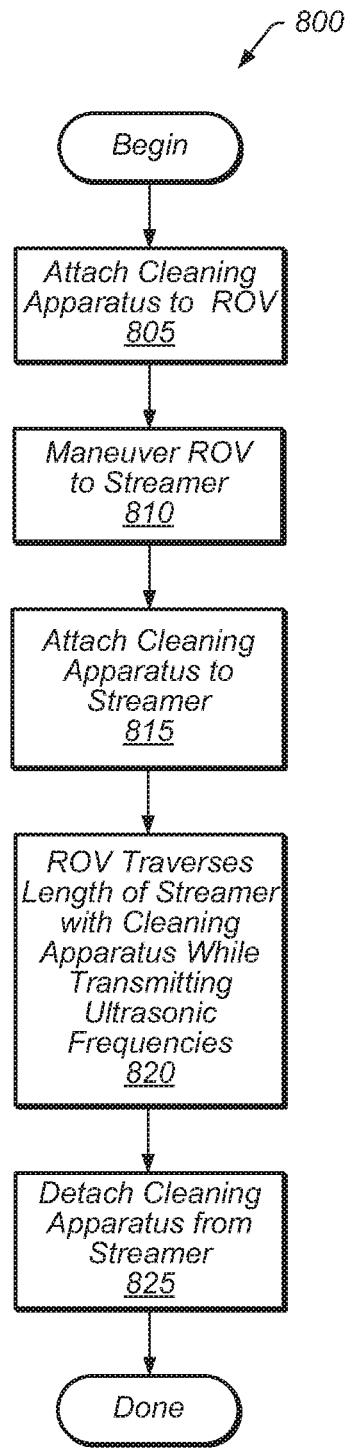
FIG. 10 is a flow diagram illustrating one embodiment of a method for cleaning a sensor streamer using a cleaning apparatus controlled by an ROV that includes transducers for transmitting ultrasonic frequencies.

FIG. 10 is a flow diagram of one embodiment of a method for conducting a cleaning of a submerged, towed streamer using an ROV and an attached cleaning apparatus. Method 800 begins with the attachment of a cleaning tool to an ROV (block 805). After the cleaning tool is securely attached, the ROV may be maneuvered to a streamer to be cleaned (block 810). The ROV may maneuver into such a position that the cleaning tool is attached to the streamer (block 815).

Upon attaching the cleaning apparatus to the streamer, the cleaning operation may commence. The ROV may propel the cleaning apparatus along the streamer, traversing its length (block 820). The ROV in one embodiment may include one or more transducers, and may thus transmit sound at one or more ultrasonic frequencies as it propels the cleaning tool along the streamer. Upon reaching the end of the streamer (or the end of the portion to be cleaned), the ROV may detach the cleaning tool from the streamer (block 825). The cleaning tool may then be returned to a chase vessel for retrieval, or the ROV may be maneuvered into position to clean another streamer.

Figure 11:
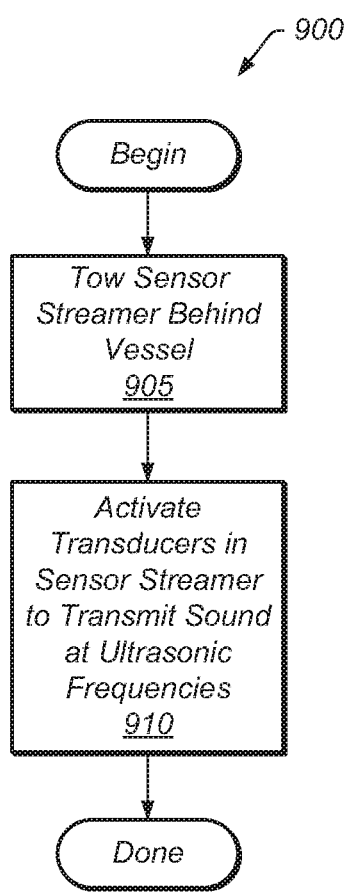
FIG. 11 is a flow diagram illustrating one embodiment of a method for cleaning a sensor streamer having integrated transducers for transmitting ultrasonic frequencies integrated therein.

FIG. 11 is a flow diagram of a method for conducting a cleaning in which ultrasonic frequencies are transmitted from transducers integrated into a streamer. In method 900, a streamer is towed behind a survey vessel (block 905). The streamer may be one of a number of streamers in an array, although embodiments are possible and contemplated wherein only a single streamer is towed. During the conducting of a cleaning operation, the transducers integral to the streamer may be activated to transmit sound at one or more ultrasonic frequencies. Cleaning may also be aided by other types of cleaning devices (e.g., the SCU or cleaning tool discussed above) in some embodiments.

Figure 12:
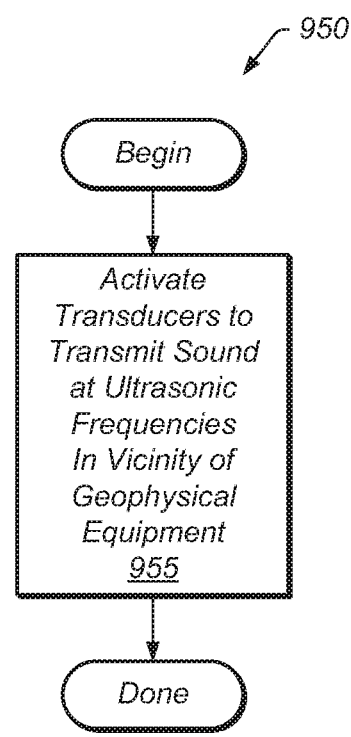
FIG. 12 is a flow diagram illustrating one embodiment of a method for cleaning geophysical equipment using one or more transducers transmitting ultrasonic frequencies.

Turning now to FIG. 12, a flow diagram illustrating one embodiment of a method for cleaning geophysical equipment using one or more transducers transmitting ultrasonic frequencies is shown. Method 950 in the embodiment shown comprises the transmission of sound at one or more ultrasonic frequencies by one or more transducers in the vicinity of the geophysical equipment to be cleaned (block 955). As noted above, the transmission of sound at ultrasonic frequencies may either loosen or remove altogether obstructions such as barnacle larvae that are attached to the external surfaces of the geophysical equipment. In some embodiments, certain frequencies may be particularly effective in removing obstructions, although transmissions may occur over a range of frequencies or at a number of different discrete frequencies.

Numerous variations and modifications will become apparent to those skilled in the art once the above disclosure is fully appreciated. It is intended that the following claims be interpreted to embrace all such variations and modifications.

What is claimed is:

1. A method comprising:
   towing geophysical equipment behind a survey vessel; and
   cleaning the geophysical equipment while the geophysical equipment is being towed, wherein the cleaning is performed at least in part by transmission of ultrasonic sound by one or more transducers coupled to a remotely operated vehicle (ROV) controlled via a cable connected to a chase vessel.

2. The method as recited in claim 1, wherein the geophysical equipment is a sensor streamer, and wherein the method further comprises:
   the ROV traversing a length of the sensor streamer; and
   transmitting the ultrasonic sound toward the sensor streamer during the traversing the length of the sensor streamer.

3. The method as recited in claim 1, wherein the transmission of the ultrasonic sound comprises sweeping across a range of ultrasonic frequencies.

4. The method as recited in claim 1, further comprising:
   conducting a marine geophysical survey with the geophysical equipment.

5. The method as recited in claim 4, further comprising:
   collecting data from the marine geophysical survey; and
   storing the collected data.

6. The method as recited in claim 5, wherein the collected data is stored on a non-transitory, computer-readable medium.

7. A method, comprising:
   towing geophysical equipment including a sensor streamer behind a vessel;
   a remotely operated vehicle (ROV) attaching a streamer cleaning unit (SCU) to the sensor streamer at a first position;
   while traversing from the first position to a second position, the SCU cleaning the sensor streamer by transmission of ultrasonic frequencies from one or more ultrasonic transducers;
   subsequent to attaching the SCU to the sensor streamer at the first position, the ROV detaching from the SCU; and subsequent to the SCU traversing from the first position to the second position, the ROV re-attaching to the SCU to detach the SCU from the sensor streamer.

8. The method as recited in claim 7, wherein the traversing includes the SCU traversing from the first position to the second position based on hydrodynamic drag.

9. The method as recited in claim 7, wherein the transmission of ultrasonic frequencies includes sweeping across a range of ultrasonic frequencies.

10. The method as recited in claim 7, wherein the one or more ultrasonic transducers are piezoelectric transducers.

11. The method as recited in claim 7, wherein the SCU is configured to clean the sensor streamer with a brush.

12. The method as recited in claim 7, further comprising: conducting a marine geophysical survey with the geophysical equipment.

13. The method as recited in claim 12, further comprising: collecting data from the marine geophysical survey; and storing the collected data.

14. The method as recited in claim 13, wherein the collected data is stored on a non-transitory, computer-readable medium.

15. The method of claim 1, further comprising:
activating the one or more transducers responsive to a first input; and
deactivating the one or more transducers responsive to a second input.

16. The method of claim 7, wherein the sensor streamer includes a stopper, wherein the stopper is configured to hold the SCU in place while the ROV detaches the SCU from the sensor streamer.

17. A method, comprising:
towing geophysical equipment including a sensor streamer behind a vessel;
a streamer cleaning unit (SCU) attaching to the sensor streamer at a first position, wherein the SCU is configured to:
traverse from the first position to a second position on the sensor streamer; and
while traversing from the first position to the second position, clean the sensor streamer by transmission of ultrasonic frequencies from one or more ultrasonic transducers;
after attaching the SCU to the sensor streamer at the first position, a remotely operated vehicle (ROV) detaching from the SCU; and
after the SCU traverses from the first position to the second position, the ROV re-attaching to the SCU to detach the SCU from the sensor streamer.

\* \* \* \* \*